(12) United States Patent
Wass

(10) Patent No.: US 7,195,029 B2
(45) Date of Patent: Mar. 27, 2007

(54) INFLATE AND DEFLATE VALVE

(76) Inventor: Lloyd G. Wass, P.O. Box 39 (425-7th Ave.), Ironton, MN (US) 56455-0039

( * ) Notice: Subject to any disclaimer, the term of this patent is extended or adjusted under 35 U.S.C. 154(b) by 0 days.

(21) Appl. No.: 10/213,297

(22) Filed: Aug. 6, 2002

(65) Prior Publication Data
US 2003/0066559 A1 Apr. 10, 2003

Related U.S. Application Data

(60) Provisional application No. 60/310,109, filed on Aug. 6, 2001.

(51) Int. Cl.
*F16K 15/20* (2006.01)
*B61D 45/00* (2006.01)

(52) U.S. Cl. .............. 137/223; 137/523; 137/541; 410/119

(58) Field of Classification Search .......... 137/223, 137/454.5, 522, 523, 541, 542; 410/119, 410/124, 125
See application file for complete search history.

(56) References Cited

U.S. PATENT DOCUMENTS

| | | | | |
|---|---|---|---|---|
| 1,508,984 A | * | 9/1924 | Myers | 137/223 |
| 2,930,397 A | * | 3/1960 | Herman | 137/541 |
| 3,808,981 A | * | 5/1974 | Shaw | 410/119 |
| 4,015,622 A | * | 4/1977 | Pagani | 137/223 |
| 4,073,389 A | * | 2/1978 | Angarola et al. | 410/119 |
| 4,146,069 A | * | 3/1979 | Angarola et al. | 137/223 |
| 4,579,141 A | * | 4/1986 | Arff | 137/223 |
| 5,082,244 A | * | 1/1992 | Krier et al. | 410/125 |
| 5,111,838 A | * | 5/1992 | Langston | 137/223 |
| 5,871,031 A | * | 2/1999 | Greinacher | 137/599.08 |
| 5,941,272 A | * | 8/1999 | Feldman | 137/223 |
| 5,971,016 A | | 10/1999 | Wass et al. | |
| D470,570 S | | 2/2003 | Wass | |
| 2003/0159731 A1 | | 8/2003 | Wass et al. | |

OTHER PUBLICATIONS

"Universal Flange Topping Valves and Accessories;" http://www.miradaresearch.com/inflation_valves/tv.htm; Miranda Research & Manufacturing, Inc.; Ironton, MN; date unknown.

* cited by examiner

*Primary Examiner*—John Rivell
(74) *Attorney, Agent, or Firm*—Gray, Plant, Mooty, Mooty & Bennett, PA; Peter Forrest

(57) ABSTRACT

An inflate/deflate valve of a heavy duty design for use during inflation of inflatable devices such as dunnage bags. Such dunnage bags are used in hostile or rough environments where when deflated the dunnage bags are stacked and compressed into storage drums where the inflate/deflate valves may be crushed or forced against the cuttable or ripable dunnage bag material. As a result, a novel and unique design is provided including a valve body, a spring, an optional washer, a spring retainer, a poppet, poppet seal and an o-ring.

12 Claims, 4 Drawing Sheets

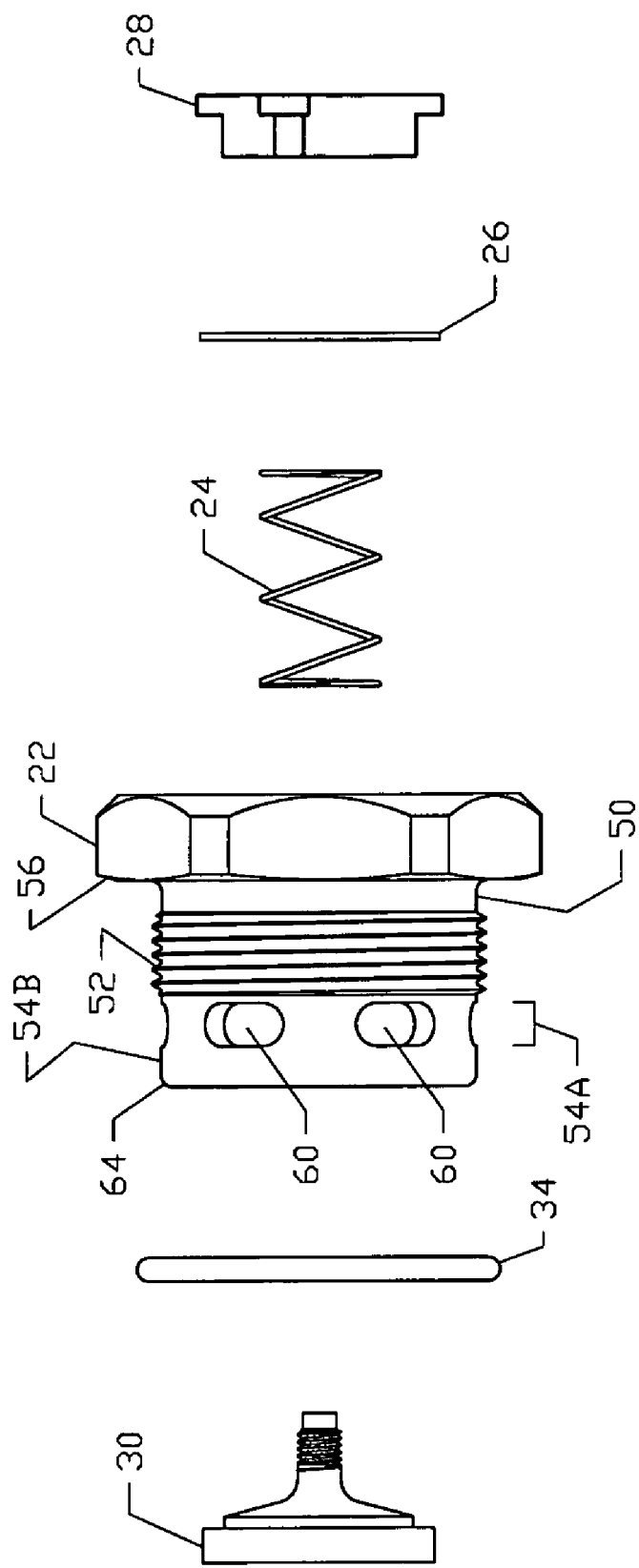

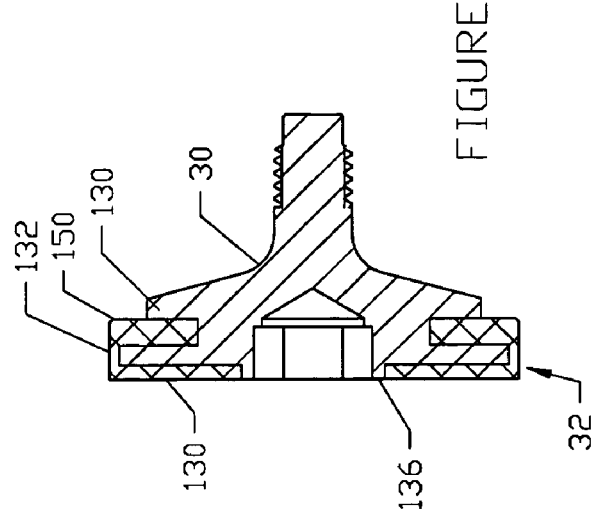
FIGURE 10
FIGURE 11
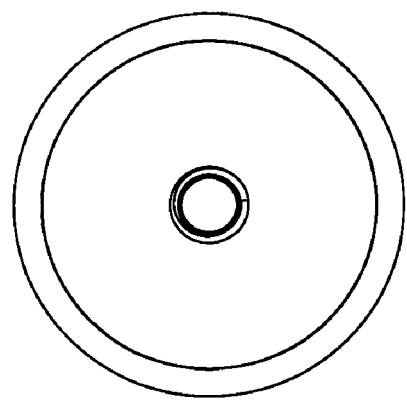
FIGURE 9
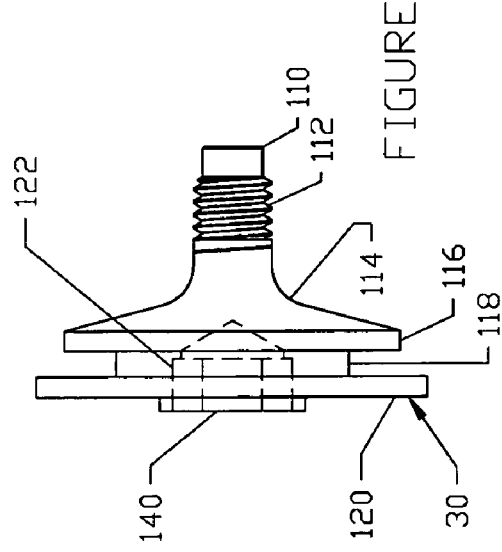
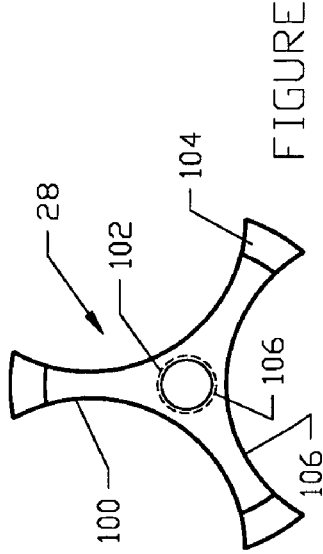
FIGURE 8

INFLATE AND DEFLATE VALVE

CROSS REFERENCE TO RELATED APPLICATIONS

This application claims priority to U.S. Provisional Patent Application Ser. No. 60/310,109 filed on Aug. 6, 2001.

BACKGROUND OF THE INVENTION

1. Technical Field

The invention relates to a valve for use during inflation and deflation of inflatable devices. More particularly, the invention is an inflate-deflate valve for use during inflation of inflatable devices such as dunnage bags.

2. Background Information

The ever-growing popularity over the past century of shipping cargo by plane, train, boat, or truck has also led to a growing need to store such cargo in a safe manner to prevent or reduce the chance of breakage, etc. One method of protecting cargo is the dunnage bag which is an inflatable bag used as a spacer in between cargo. In effect, the dunnage bag fills the void in between the cargo thereby giving it nowhere to move or shift to. Dunnage bags are very popular in a number of industries including the paper industry.

The dunnage bags may either be placed in between sections, pallets, or the like during loading, or once the cargo is loaded, the bags may be carefully positioned therebetween. In either case, the bags may be inflated during loading, or once loading is complete. The result is that substantially all free space in between the cargo is filled as well as space in between the cargo and the cargo container walls such that no or minimal movement is possible.

Once the cargo reaches its destination, the dunnage bags are deflated and removed. The dunnage bags then need to be stored and returned to the source of cargo for use again. Typically, the bags are deflated, stacked on top of each other in a big drum or dunnage bag shipping container and then shipped back.

Typical inflate and deflate valves are insufficient due to the rough environment and the need for rapid deflation. The cargo containers are often not clean and include abrasive or rigid walls. The dunnage bags are often stepped on when deflated thereby damaging the valves and/or causing the valve which often has sharp edges to damage the dunnage bag.

A need exists for an improved inflate-deflate valve capable of rapid deflation, and designed for a rough environment such that damage to the valve and dunnage bag is avoided or significantly reduced.

SUMMARY OF THE INVENTION

Objectives of the invention include providing an improved inflate-deflate valve, and particularly a valve capable of rapid deflation, and designed for a rough environment such that damage to the valve and dunnage bag is avoided or significantly reduced.

These objectives and advantages as well as others not addressed herein but readily apparent to one of skill in the art are obtained by the improved inflate-deflate valve for inflatable devices including dunnage bags of the present invention, the general nature of which may be stated as including a valve body, a spring, a spring retainer, a poppet, a poppet seal, and an o-ring.

BRIEF DESCRIPTION OF THE DRAWINGS

The preferred embodiment of the invention, illustrative of the best mode in which applicant has contemplated applying the principles, is set forth in the following description and is shown in the drawings and is particularly and distinctly pointed out and set forth in the appended claims.

FIG. 3 is an assembly view of the inflate-deflate valve of FIG. 1;

FIG. 8 is an end view of the spring retainer of the inflate-deflate valve of FIG. 1;

FIG. 9 is a side view of the poppet of the inflate-deflate valve of FIG. 1;

FIG. 10 is an end view of the poppet of FIG. 9; and

FIG. 11 is a side view of the poppet and poppet seal of the inflate-deflate valve of FIG. 1.

Similar numerals refer to similar parts throughout the drawings.

DESCRIPTION OF THE PREFERRED EMBODIMENTS

Figure 2:
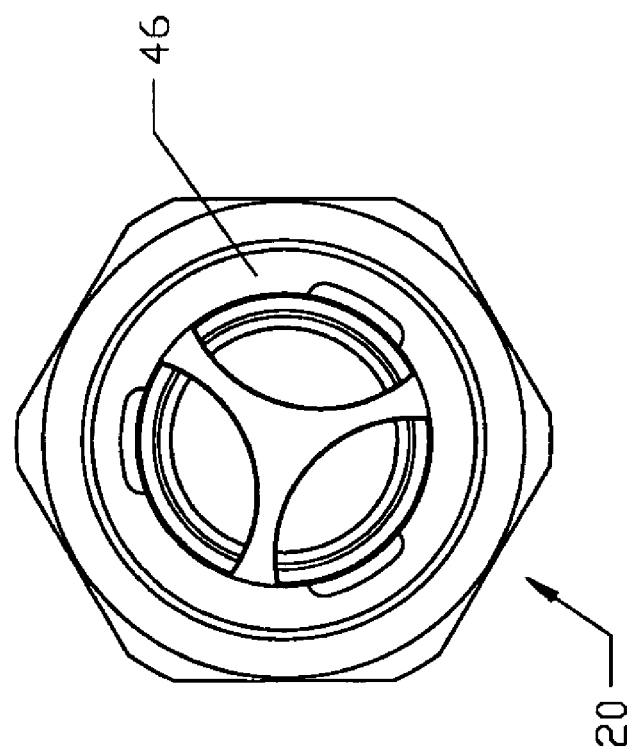
FIG. 2 is an end view of the inflate-deflate valve of FIG. 1.

The present invention is a valve embodied as shown in the Figures as an inflate/deflate valve 20. The inflate/deflate valve 20 is a heavy duty valve for use with inflatable devices such as dunnage bags. As noted above, such dunnage bags are used in hostile or rough environments where when deflated the dunnage bags are stacked and compressed into storage drums where the inflate/deflate valves may be crushed or forced against the cuttable or ripable dunnage bag material.

In the embodiment shown, the inflate/deflate valve 20 is a heavy duty valve having numerous features for overcoming the shortcomings of typical inflate/deflate valves. The inflate/deflate valve 20 includes a valve body 22, a spring 24, an optional washer 26, a spring retainer 28, a poppet 30, poppet seal 32 and an o-ring 34.

Figure 1:
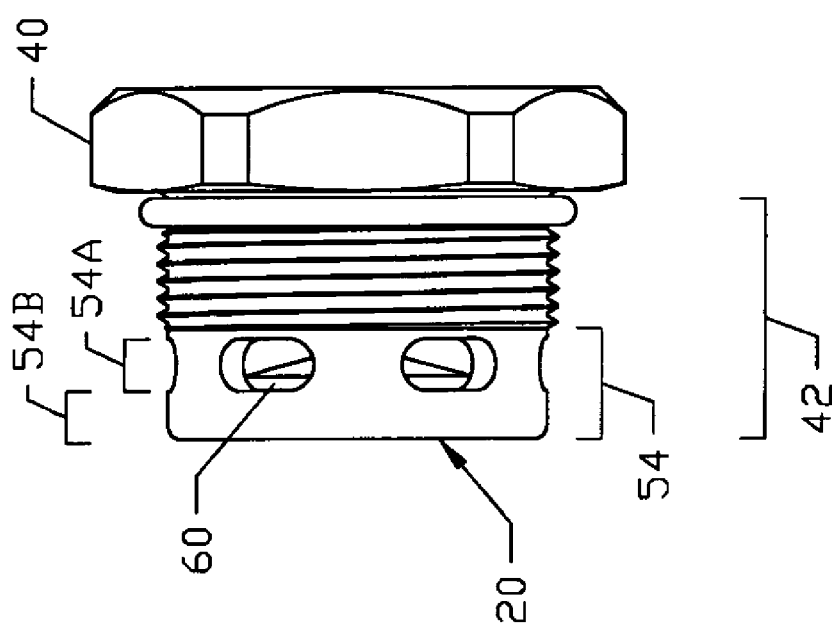
FIG. 1 is a side view of the inflate-deflate valve of the present invention.
Figures 5, 7:
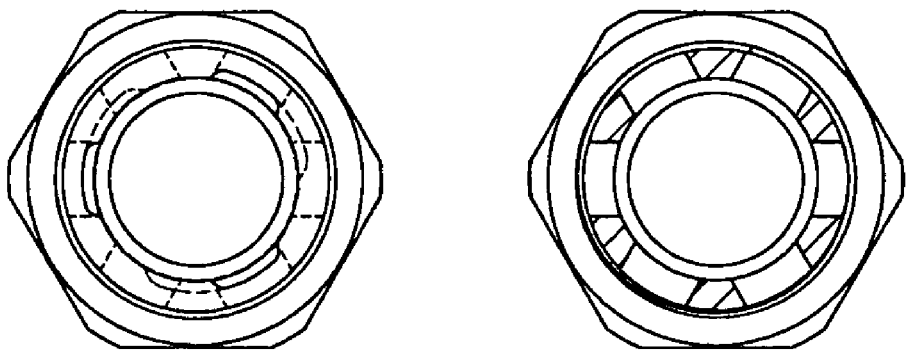
FIG. 5 is a top view of the valve body of FIG. 4.
FIG. 7 is a sectional view of the valve body of FIGS. 4–5 taken along line B—B in FIG. 4.
Figure 4:
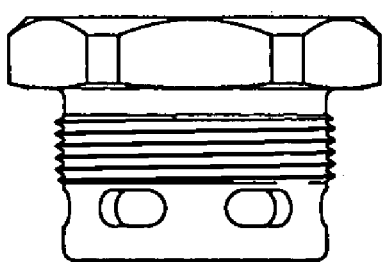
FIG. 4 is a side view of the valve body of the inflate-deflate valve of FIG. 1.

The valve body 22 as best shown in FIGS. 1–3 includes a head 40 and a neck 42. The head 40 is of a hexagon, octagon or similar design for receiving a standard wrench or other device for turning the valve body (threading the valve body into the threadable port in the inflatable device such as a dunnage bag. The head includes an end face having a circular hole 46 therein.

The neck 42 of the valve body 22 includes an o-ring receiving portion 50, a threaded portion 52, and an end portion 54. The o-ring receiving portion 50 is defined as the portion between a shoulder 56 extending out at the head, and the threaded portion 52. This portion is defined to snuggly receive the o-ring and may in some embodiments be of a lesser diameter than the adjacent shoulder 56 and head 40, and the threaded portion 52. In other embodiments, the o-ring receiving portion 50 may also be a groove defined in shape to seat the o-ring.

The threaded portion 52 includes threads for threadably securing the valve 20 into the threadable port, often in some form of a flange, in the inflatable device such as a dunnage bag.

The end portion 54 includes an air evacuation section 54A circumferentially around the valve body nearest the threaded portion 52. This air evacuation section includes a plurality of apertures 60 therein through which air or other fluid is released during inflation or deflation as described better below. The plurality of apertures 60 in the embodiment shown are a plurality of elongated slots.

The end portion further includes a protection section 54B extending outward from the air evacuation section. The protection section extends from the air evacuation section to smooth or radiused edges 64 transitioning to an end face of the valve having a circular hole 68 therein.

Figure 6:
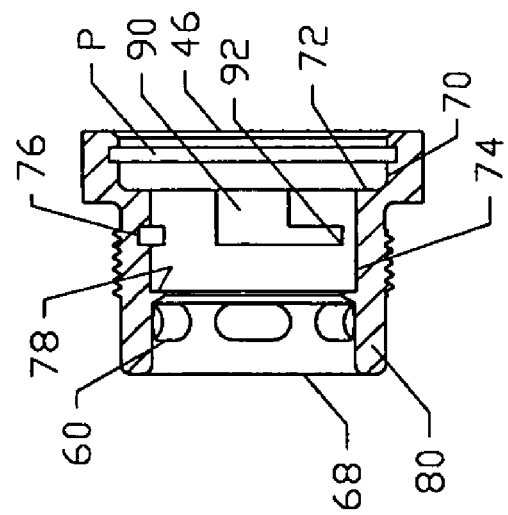
FIG. 6 is a sectional view of the valve body of FIGS. 4–5 taken along line A—A in FIG. 5.

A passage P extends from hole 46 to hole 68 and is best shown in FIG. 6. Starting at the end of hole 46, the passage includes a first diameter section 70 extending to a shoulder 72, a second diameter section 74 having a plurality of locking slots 76 therein, a stop or lip 78, and a third diameter section 80 with the plurality of apertures 60 therein. The locking slots 76 are L-shaped grooves having an axial groove part 90 used for allowing the spring retainer 28 to axially slide within the passage while also providing a locking seat or circumferential groove 92 extending therefrom. The spring retainer freely moves along the axial groove part 90 except for the bias from the spring 24 which biases the retainer toward the end of the groove 90 opposite the groove 92, unless the spring retainer is pushed fully inward and then rotated into the groove 92 whereby the retainer 28 is then prohibited from returning toward the end of groove 90.

The spring 24 is a spring or other like device used to bias parts away from one another. The spring 24 seats at one end of the spring within the spring retainer 28 and at its other end against stop or lip 78.

The spring retainer 28 is shown in FIG. 8 from the side that engages the spring. The spring retainer 28 includes a plurality of arms 100, in this case three but other numbers may be used, that extend from a center hub 102. The arms extend outward and include a cut-away 104 at their ends where the spring seats. The center hub 102 includes a threaded port or hole 106 in which the poppet threads during assembly. The threaded port or hole preferably extends only partially through the retainer thereby prohibiting over insertion of the poppet.

The poppet 30 is shown in FIGS. 9–11. The poppet 30 includes a shaft 110 with a threaded part 112, a tapered neck 114, a first head 116 of a first diameter, a groove 118, a second head 120 of a second diameter larger than the first diameter, and a hole 122 in the end face of the second head 120.

The poppet seal 32 is a rubber, polymer or like material including a planer end surface 130, a substantially perpendicular edge 132 extending away from the end surface and defining a cavity on the one side of the end surface, and a circumferential inwardly extending lip 134 that extends from the distal end of the edge 132 in relation to the end surface. This design is best shown in FIG. 11 where the poppet seal 32 is positioned over the poppet 30. The poppet seal 32 also includes a hole 136 aligned with the hole 122 so that a fastener 140 with a slight head may secure the poppet seal to the poppet.

In assembly, spring 24 is inserted into the valve body such that one end of the spring seats against stop or lip 78. The spring retainer 28 is positioned such that its arms 100 are within the locking slots 76, and spring 24 is seated against cut-aways 104. Poppet 30 is inserted into the valve body whereby it seats against stop or lip 78 on the opposite side thereof as the spring is seated. Specifically, a shoulder 150, created by the poppet seal 32 extending circumferentially further outward than the poppet 30 and preventing the poppet from passing through the hole within the lip, rests against the lip 78. The spring is compressed as the spring retainer is forced toward the poppet, and the poppet 30 is threadably inserted into the spring retainer, specifically the shaft 110 is threaded into the center hub 102.

The spring retainer 28 is now a fixed distance from the poppet 30 so any movement of either one causes a corresponding equal movement of the other. At the same time, the spring 24 is positioned in between the spring retainer 28 and a fixed lip 78 so the spring is biasing the spring retainer away from the lip 78, and thus pulling the poppet into a tight engagement with lip 78 thereby sealing off fluid flow from the passage P extending from hole 46, to hole 68 and apertures 60.

If the spring is compressed (bias overcome), then the poppet 30 may disengage the lip 78 thereby allowing for fluid flow. This can be done by pressing the spring retainer toward the poppet where the spring retainer travels along groove 90. Furthermore, the valve may be locked open by using the locking motion of twisting the spring retainer after pressing it whereby the spring retainer follows the groove 90 axially and then is twisted into groove 92.

When open, the poppet of the valve never leaves the protection of the interior passage P where it is protected by the valve body. In standard inflate/deflate valves, topping valves or other similar valves, to open the valve the poppet pops out of the end and allows for fluid flow around the poppet. In this novel design, the poppet also may allow flow around the poppet, but the substantial air flow occurs via the plurality of apertures 60 as the poppet unseats from the lip 78 and passes by these apertures 60. This is very effective in protecting the fragile poppet seal and poppet from damage particularly since in most dunnage bags the valve will be opened for deflate and left open as the bags are deflated, squished or otherwise to get all of the air out, thrown on top of one another and stacked and shipped back. Effectively, when not in the use the valves in the dunnage bags are locked open and this design protects the critical internal valve components from damage.

Another novel feature of the present invention is the use of thicker walls in the valve body. In the preferred embodiment, the valve walls are made between ⅛ and ¼ inch thick on a valve with a total maximum diameter of between approximately 1 and 2 inches. This greater wall thickness allows the edges to be smoothed or radiused to prevent sharp edges that can damage the rubber, polymer or other flexible materialed dunnage bag, particularly during deflated shipment.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved inlet check valves and manifold are constructed and used, the characteristics of the construction, and the advantageous, new and useful results obtained; the new and useful structures, devices, elements, arrangements, parts and combinations, are set forth in the appended claims.

The invention claimed is:

1. An inflate/deflate valve that includes:
a valve body having an interior passage therein with a stop therein, a poppet movable within the interior passage of the valve body to selectively allow fluid flow through the valve body when the poppet is not seated against the stop within the valve body, and selectively block fluid flow through the valve when the poppet is seated against the stop within the valve body, whereby the poppet and valve body are further designed such that the poppet always remains protected within the interior passage,
a spring biasing the poppet into its seated position against the stop,
a spring retainer for holding the spring within the valve body, and
a poppet seal for sealing the poppet against the stop;
in which the interior passage includes at least one axially inwardly extending groove with a transverse groove extending from the innermost portion of the inwardly extending groove for holding the poppet in an open position when pushed fully inward and twisted, so that the poppet is selectively lockable within the interior passage when not seated against the stop, to allow fluid flow through the valve body; and the valve body further comprises a plurality of apertures extending circumferentially around and perpendicularly through the valve body, such that fluid flow is directed through these apertures when the poppet unseats from the stop and passes by these apertures.

2. The inflate/deflate valve of claim 1, further including a shoulder defined by the poppet seal extending circumferentially further outward than the poppet and preventing the poppet from passing through an area within the stop.

3. The inflate/deflate valve of claim 2 wherein the poppet seal further includes an end surface, a substantially perpendicular edge extending away from the end surface and defining a cavity on the one side of the end surface, and a circumferential inwardly extending lip that extends from the distal end of the edge in relation to the end surface.

4. The inflate/deflate valve of claim 3 wherein the valve body includes an o-ring receiving portion, a threaded portion, and an end portion, whereby the o-ring receiving portion is defined to snuggly receive the o-ring, the threaded portion includes threads for threadably securing the valve into an inflatable device, and the end portion includes an air evacuation section circumferentially around the valve body nearest the threaded portion.

5. The inflate/deflate valve of claim 4 wherein the plurality of apertures are a plurality of elongated slots.

6. The inflate/deflate valve of claim 5 wherein the end portion further includes a protection section extending outward from the air evacuation section.

7. The inflate/deflate valve of claim 6 wherein the end portion further includes plurality of smooth or radiused edges transitioning to an end face of the valve body.

8. An inflate/deflate valve for use with inflatable devices such as dunnage bags, the valve comprising:
a valve body including a head having a first hole therein, and a neck having a second hole therein, whereby an interior passage with a stop therein extends through the valve body from the first hole to the second hole;
a poppet;
a poppet seal including an end surface, a substantially perpendicular edge extending away from the end surface and defining a cavity on the one side of the end surface, and a circumferential inwardly extending lip that extends from the distal end of the edge in relation to the end surface;
a spring retainer is securable within the interior passage; and a spring seated between the spring retainer and the poppet for holding the poppet in the valve body and biasing the poppet against the stop in the interior passage;
in which the interior passage includes at least one axially inwardly extending groove with a transverse groove extending from the innermost portion of the inwardly extending groove for holding the poppet in an open position when pushed fully inward and twisted, so that the poppet is selectively lockable within the interior passage when not seated against the stop to allow fluid flow through the valve body; and the valve body further comprises a plurality of apertures extending circumferentially around and perpendicularly through the valve body, such that fluid flow is directed through these apertures when the poppet unseats from the stop and passes by these apertures.

9. The inflate/deflate valve of claim 8 wherein the poppet is movable within the interior passage of the valve body to selectively allow fluid flow through the valve body when the poppet is not seated against the stop within the valve body, and selectively block fluid flow through the valve when the poppet is seated against the stop within the valve body, whereby the poppet and valve body further designed such that the poppet always remains protected within the interior passage.

10. An inflate/deflate valve, comprising: a valve body defining an interior passage, a stop in the interior passage, and an air evacuation section comprising a plurality of apertures extending circumferentially around and perpendicularly through the evacuation section; a poppet movable entirely within only the interior passage to selectively allow fluid flow through the interior passage when not seated against the stop; a spring retainer, attached to the poppet; and a spring held between the spring retainer and the valve body to bias the poppet into its seated position against the stop; in which the spring retainer is selectively lockable within the interior passage to unseat the poppet from the stop and allow fluid flow through the valve body and the apertures.

11. The inflate/deflate valve of claim 10, in which the interior passage includes at least one groove having a transverse portion.

12. The inflate/deflate valve of claim 11, in which the spring retainer is lockable by twisting the spring retainer into the transverse portion of the groove.

* * * * *